US00RE49607E

(19) United States
(12) Reissued Patent
Connery et al.

(10) Patent Number: US RE49,607 E
(45) Date of Reissued Patent: Aug. 15, 2023

(54) COAT-IN-PLACE ASSEMBLIES AND METHODS TO PROVIDE AN AESTHETICALLY PLEASING SPRINKLER ASSEMBLY

(71) Applicant: Tyco Fire Products LP, Lansdale, PA (US)

(72) Inventors: Luke Stevenson Connery, Rehoboth, MA (US); Jeffrey Martin Brighenti, Cranston, RI (US); Bharani Kannan, Chennai (IN); Manikandan Krishnaswamy, Bangalore (IN); Kenneth Robert Brown, Chesterfield, MO (US); Joseph W. Beagen, West Warwick, RI (US)

(73) Assignee: Tyco Fire Products LP, Cranston, RI (US)

(21) Appl. No.: 17/681,553

(22) Filed: Feb. 25, 2022

Related U.S. Patent Documents

Reissue of:
(64) Patent No.: 9,931,660
Issued: Apr. 3, 2018
Appl. No.: 14/992,311
Filed: Jan. 11, 2016

U.S. Applications:
(62) Division of application No. 16/791,562, filed on Feb. 14, 2020, which is an application for the reissue of
(Continued)

(51) Int. Cl.
*B05D 1/32* (2006.01)
*B05B 15/00* (2018.01)
(Continued)

(52) U.S. Cl.
CPC ..... *B05B 12/20* (2018.02); *A62C 31/02* (2013.01); *A62C 35/68* (2013.01); *B05B 15/16* (2018.02); *B05D 1/32* (2013.01)

(58) Field of Classification Search
CPC ..... A62C 35/68; A62C 31/02; B05B 15/16; B05B 12/20; B05D 1/32
See application file for complete search history.

(56) References Cited

U.S. PATENT DOCUMENTS 4,066,129 A 1/1978 Anderson
4,825,805 A 5/1989 Walker
(Continued)

FOREIGN PATENT DOCUMENTS

CN 1642659 7/2005
JP 2001-161852 6/2001
(Continued)

OTHER PUBLICATIONS

English language machine translation of JP2001161852 to Toshiaki Tonomura with JP2001161852, Sep. 11, 2017, 22 pages.
(Continued)

*Primary Examiner* — Elizabeth L McKane
(74) *Attorney, Agent, or Firm* — Foley & Lardner LLP

(57) ABSTRACT

Coat-in-place assemblies and methods to provide an aesthetically pleasing sprinkler assembly. A coat-in-place assembly includes a sprinkler body having a proximal portion and a distal portion, a thermally responsive trigger disposed adjacent the distal portion; and an escutcheon centered about the distal portion of the sprinkler body to define a void between the sprinkler axis and the escutcheon. A coating-inhibiting-cap encloses and protects the thermally responsive trigger between the sprinkler body and the cap. The cap extends into the void and is radially spaced inward relative to the escutcheon so as expose surfaces of the escutcheon for coating.

41 Claims, 3 Drawing Sheets

Related U.S. Application Data

Pat. No. 9,931,660, which is a division of application No. 14/538,500, filed on Nov. 11, 2014, now Pat. No. 9,616,450.

(60) Provisional application No. 62/005,800, filed on May 30, 2014.

(51) Int. Cl.

| | |
|---|---|
| ***B05B 12/20*** | (2018.01) |
| ***B05B 15/16*** | (2018.01) |
| ***A62C 31/02*** | (2006.01) |
| ***A62C 35/68*** | (2006.01) |

(56) References Cited

U.S. PATENT DOCUMENTS

| | | | | |
|---|---|---|---|---|
| 5,447,338 | A | 9/1995 | Kikuchi | |
| 6,044,912 | A | 4/2000 | Tsuji et al. | |
| 6,103,974 | A | 8/2000 | Erdfarb | |
| 6,131,822 | A | 10/2000 | Farmer et al. | |
| 6,152,236 | A | 11/2000 | Retzloff et al. | |
| 6,484,809 | B1 | 11/2002 | Elder | |
| 7,540,330 | B2 | 6/2009 | Orr et al. | |
| 8,646,539 | B2 | 2/2014 | Abels et al. | |
| 9,616,450 | B2 * | 4/2017 | Connery | B05B 15/001 |
| 2006/0037761 | A1 * | 2/2006 | Shim | A62C 37/09 169/37 |
| 2008/0197133 | A1 | 8/2008 | McKay et al. | |
| 2010/0263883 | A1 | 10/2010 | Abels et al. | |
| 2017/0319884 | A1 | 11/2017 | Oldham | |

FOREIGN PATENT DOCUMENTS

| | | | | |
|---|---|---|---|---|
| JP | 2001161852 | A | * | 6/2001 |
| WO | WO-2008/067421 | A2 | | 6/2008 |
| WO | WO-2010/141948 | A1 | | 12/2010 |

OTHER PUBLICATIONS

IFW, U.S. Appl. No. 62/005,800, filed May 30, 2014.

International Preliminary Exam Authority, International Preliminary Report on Patentability of PCT/US2015/032981, dated Jun. 13, 2016, May 12, 2016 Article 34 Amendment, 18 pages.

International Searching Authority, International Search Report and Written Opinion issued in PCT/U52015/032981, dated Sep. 22, 2015, 12 pages.

Tyco Fire Products, Datasheet, Raven 5.6K Institutional Sprinklers Pendent and Horizontal Sidewall Quick Response, . . . Extended Coverage, TFP 651, Jan. 2012, 10 pages.

U.S. Appl. No. 62/005,800, filed May 30, 2014.

English language machine translation of JP2001161852 to Toshiaki Tonomura with JP200116852, Sep. 11, 2017, 22 pages.

* cited by examiner

COAT-IN-PLACE ASSEMBLIES AND METHODS TO PROVIDE AN AESTHETICALLY PLEASING SPRINKLER ASSEMBLY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY DATA AND INCORPORATION BY REFERENCE

*More than one reissue application of U.S. Pat. No. 9,931,660 has been filed. This application is a reissue of U.S. patent application Ser. No. 14/992,311, filed Jan. 11, 2016, now U.S. Pat. No. 9,931,660.* This application is *also a reissue divisional of U.S. patent application Ser. No. 16/791,562, filed Feb. 14, 2020, which is an application for reissue of U.S. patent application Ser. No. 14/992,311, filed Jan. 11, 2016, now U.S. Pat. No. 9,931,660, issued Apr. 3, 2018, which is* a Divisional Application of U.S. patent application Ser. No. 14/538,500, filed on Nov. 11, 2014, which claims the benefit of priority to U.S. Provisional Patent Application No. 62/005,800, filed on May 30, 2014, each of which is incorporated by reference in their entirety.

TECHNICAL FIELD

The present invention relates generally to fire protection devices and more specifically to concealed fire protection sprinklers used preferably, for example, in concrete ceilings and/or other institutional, commercial or residential installations.

BACKGROUND ART

Concealed-type fire protection sprinklers, which discharge a fire fighting fluid such as water, gas or other chemical agent, can be designed to protect a variety of occupancies, both commercial and residential. Generally, the concealed nature of these sprinklers obscures the internal components of the sprinkler from view for at least aesthetic reasons depending upon the given installation. Accordingly, these sprinklers can provide a flushed mounting that is aesthetically pleasing because of its low profile and concealment of internal components. Generally, this type of flush-mounted sprinkler includes a sprinkler body in which its internal operating components are concealed by a thermally responsive trigger. Surrounding the sprinkler body and a thermally responsive cover plate assembly is an escutcheon that conceals the sprinkler body projecting from the wall and/or provides a transition to the mounting surface. An exemplary sprinkler includes U.S. Pat. No. 6,152,236. Another example of such a sprinkler s shown TYCO FIRE PRODUCTS LP Technical Data Sheet 651 entitled "RAVEN 5.6K Institutional Sprinklers Pendent and Horizontal Sidewall Quick Response, Standard and Extended Coverage" (August 2013), which is incorporated by reference in its entirety. Currently, known escutcheons described in TYCO Data Sheet TFP651 come in three available finishes: white, grey, chrome coated or electropolished. In addition to its appealing shape, it may be desirable to paint the escutcheon at some point after installation. For example, if the wall or surface to which the sprinkler and escutcheon are mounted is painted a new color, it may be desirable to change the color of the installed escutcheon accordingly. However, due to the close fit of the escutcheon around the cover plate, painting the escutcheon has been avoided to avoid paint from interfering with the thermal responsiveness of the cover plate or other operational components of the sprinkler.

DISCLOSURE OF INVENTION

The present invention is directed to a sprinkler assembly and method of installation that can be subsequently coated or treated to provide an aesthetically pleasing installed appearance. One preferred embodiment of a method of installation provides for a sprinkler assembly having a sprinkler body, a thermally responsive trigger and an escutcheon for in-place coating of the escutcheon mounted preferably in an operative position over the sprinkler body and trigger installed and located in a cored through hole in a wall of a protection area. As used herein, "operative position" describes the installed relative position of a component(s) to another component or structure that is desired, designed, or required in order that the component(s) operates as intended when in service. The escutcheon includes a first end and a second end spaced from the first end along the sprinkler axis. The escutcheon preferably includes a first surface circumscribed about the escutcheon axis to define a central opening for receipt of the sprinkler body, a second surface extending radially and more preferably obliquely with respect to the escutcheon axis and a transition surface continuous with the first and second surfaces and circumscribing the escutcheon axis at the first end of the escutcheon. The escutcheon is preferably a pushed-on escutcheon for mounting about the sprinkler body; preferably defines with the body one or more voids between the sprinkler assembly axis and the first surface of the escutcheon. The preferred method further includes locating a coating-inhibitor preferably embodied as a cap in the voids about the thermally responsive trigger. The preferred cap has a base defining a center and a periphery with a cap wall extending along the periphery of the base to surround a cap axis extending through the center perpendicular to the base. The cap wall is preferably spaced from the transition surface of the escutcheon so as to expose the transition and second surfaces to the protection area. The preferred method includes coating at least the transition and second surfaces of the escutcheon; and removing the cap to place the sprinkler assembly into service.

A preferred coat-in-place assembly provides an aesthetically pleasing sprinkler. The coat-in-place assembly includes a sprinkler body having a thermally responsive trigger, an escutcheon and a coating-inhibitor preferably embodied as a cap. The sprinkler body has a proximal portion and a distal portion. A thermally responsive trigger is disposed substantially perpendicular to the longitudinal axis to conceal the chamber of the body. A preferred escutcheon has a first surface circumscribed about the escutcheon axis to define a central escutcheon opening for receiving the sprinkler body. The preferred escutcheon has a second surface extending radially and more preferably obliquely with respect to the first surface and circumscribed about the central escutcheon opening such that the second surface is substantially frustoconical and a transition surface continuous between the first and second surfaces. The first surface of the escutcheon is preferably centered about the distal portion of the sprinkler body to define a void between the sprinkler axis and the first surface of the escutcheon. A preferred coating-inhibiting cap has a cover surface and an outer periphery engaging one of the distal portion of the sprinkler body and the thermally responsive trigger to enclose and protect the trigger between the sprinkler body and the cap. With the peripheral surface of the cap extending into the void and being preferably radially spaced inward relative to the first surface of the escutcheon, the transition and second surface of the escutcheon are exposed for painting.

Another preferred method of coating a sprinkler assembly includes obtaining a coating-inhibitor and distributing the coating-inhibitor to use in a coat-in-place assembly that includes the sprinkler assembly. Obtaining the coating-inhibitor preferably includes obtaining a cap including a base defining a center point and a periphery about the center point. A cap wall extending along the periphery of the base about the center point and extending axially from the base preferably substantially parallel to a cap axis passing through the center point perpendicular to the base. At least one tab preferably extends axially from one of the base or the cap wall. The preferred method includes locating the cap wall in the void about the thermally responsive trigger; and distributing the inhibitor for forming a coat-in-place assembly to coat at least the second surface and the transition surface.

BRIEF DESCRIPTION OF DRAWINGS

The accompanying drawings, which are incorporated her and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1A:
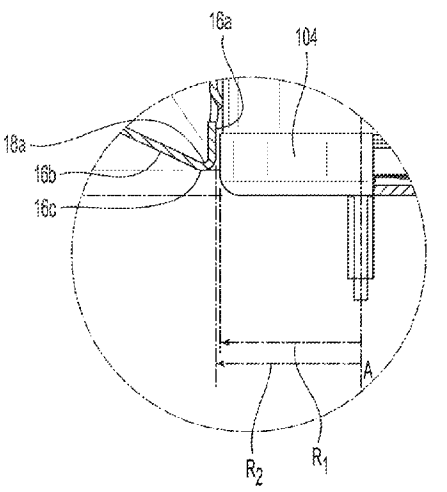
FIG. 1A is a detailed view of the preferred sprinkler assembly and coating-inhibiting-cap combination of FIG. 1.
Figure 1:
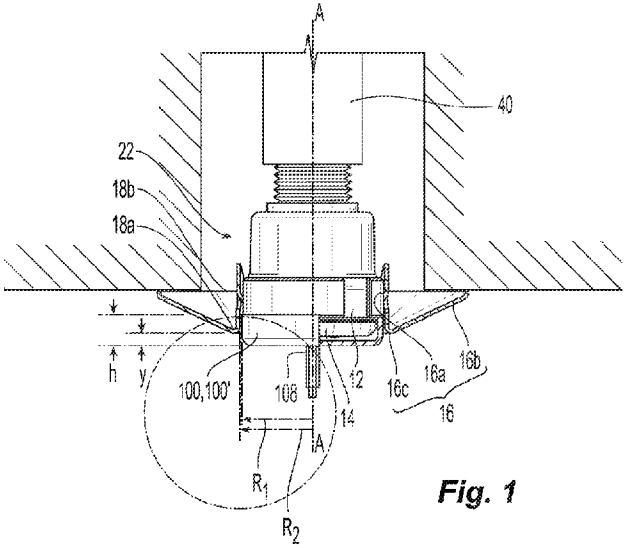
FIG. 1 is an illustrative embodiment of a preferred sprinkler assembly and coating-inhibiting-cap combination.

Shown in FIG. 1 is an installed preferred sprinkler assembly 10 mounted within and against a wall 5 with a preferred coating-inhibitor 100 engaged with the assembly. An installed sprinkler assembly 10 is coupled to fluid supply piping (not shown) and extends through a cored hole formed in the wall 5 to provide a preferred flushed mounting against the wall surface to protect an area internal to the wall, i.e., the protection area. As used herein, "wall," unless otherwise indicated, can be either a vertically extending wall or an overhead ceiling of the protection area. Accordingly, the installed fire protection sprinkler assemblies can be in any one of a pendent or sidewall orientation.

Generally, each installed sprinkler assembly 10 includes a sprinkler body 12 with a thermally responsive trigger 14 surrounded by an escutcheon 16. The coating-inhibitor 100 is engaged with the sprinkler assembly to be disposed about and over at the least the thermally responsive trigger 14. As used herein a "coating-inhibitor" 100 is a structure provided for more preferably engaging the sprinkler body 12 and/or the escutcheon 16 to surround and more particularly enclose and protect the thermally responsive trigger 14 and/or other internal operational components of the sprinkler assembly during a coating treatment, such as for example, painting. With the operational components protected, the escutcheon 16 and its external surfaces are exposed for treatment to provide an aesthetically pleasing sprinkler assembly. Accordingly, the preferred coating-inhibitor provides methods of preparing an installed sprinkler assembly for external treatment or coating application, e.g., providing a coat-in-place sprinkler assembly.

The sprinkler body 12, trigger 14 and surrounding escutcheon 16 of the preferred sprinkler assembly 10 are centrally and coaxially aligned along the sprinkler assembly axis A-A. The preferred escutcheon 16 has a first end 18a and a second end 18b spaced apart along an escutcheon axis coaxially aligned with the assembly axis A-A. The escutcheon has an internal first surface 16a surrounding and more preferably circumscribing the escutcheon axis to define a central escutcheon opening 22 for housing the sprinkler body 12 and trigger 14. The first surface 16a generally extends parallel to the sprinkler assembly axis A-A and can include additional features, as described herein, for engaging the sprinkler body 12. The escutcheon has a second surface 16b extending radially from the escutcheon axis and more preferably extending obliquely with respect to the first surface and preferably circumscribed about the central escutcheon opening 22 such that the second surface 16b is substantially frustoconical, preferably defining a first escutcheon diameter at the first end 18a and a second escutcheon diameter at the second end 18b that is greater than the first escutcheon diameter.

The escutcheon 16 also defines a transition surface 16c that is preferably continuous or contiguous with the first and second surface 16a, 16b. Moreover, the transition surface 16c preferably circumscribes the central opening 22 to define an inlet at the first end 18a to the central opening 22. The transition surface 16c is preferably curved or radiused between the first and second surfaces 16a, 16b but may be alternatively stepped or discontinuous. Accordingly in one preferred embodiment, the transition surface 16c can present a substantially convex surface to the protection area. Given the preferred flush type mounting of the preferred installed sprinkler assembly 10, the transition surface 16c is a visible external portion of the escutcheon 16 and therefore would be preferably accessible for painting or treatment in a manner described herein.

In the preferred method of coating and providing a preferably aesthetically pleasing installed sprinkler assembly, the coating-inhibitor 100 engages the sprinkler assembly so as to leave the surfaces of the escutcheon 16 sufficiently exposed and accessible for coating either by hand or machine using a brush, roller, spray or any other application equipment to apply or dispose any one of a coat, paint, stain, wall paper, adhesive, fluid or any other coating material. Generally, the preferred cap 100 includes a base 102, a cap wall 104, and one or more engagement elements, such as for example, engagement tab(s) 106, to engage any one of the sprinkler assembly 10 or thermally responsive trigger 14. The cap 100 also preferably includes a handle portion 108 for manipulating the cap into and out of engagement with the assembly. The base portion 102 preferably includes the handle portion 108. Preferably the handle portion is formed with the base 102 and extends centrally and axially along the cap axis B-B in a direction opposite the cap wall 104. The handle portion 108 preferably presents an elongate member that can be grasped by hand for handling and manipulation of the cap 100. Alternatively, the handle portion 108 can be configured as a hook or eyelet (not shown) that can be engaged by a correspondingly shaped tool.

The preferred sprinkler assembly 10 provides for one or more voids, receiving openings, ports or slots into which the cap 100 may temporarily engage and remain during the coating process and be later removed to place the system into service. More particularly, the preferred assembly 10 provides for void(s) between the sprinkler axis A-A and the escutcheon 16 to locate and/or house the cap 100. More preferably, the cap wall 104 and/or the cap engagement tab(s) 106 are preferably disposed in the void between the sprinkler body 12 and the escutcheon 16. Alternatively or in addition, the cap wall 104 and/or the cap engagement tab(s) 106 are preferably disposed in the void between the thermally responsive trigger 14 and the escutcheon 16. The engagement of the cap 100 and the sprinkler assembly 10 is preferably sufficient to maintain the cap 100 in place under opposing forces, such as for example, the force of gravity or the coating operation. Accordingly in one preferred aspect, the cap 100 forms one of a close, frictional or interference fit with one or more of the sprinkler body 12, trigger 14 and escutcheon 16. For example, the tabs 106 can engage receiving slots formed about the sprinkler body 12 in a manner described herein. Alternatively or additionally in a preferred arrangement, the first surface 16a of the escutcheon 16 defines an inner diameter proximate the transition surface 16c and the cap wall 104 defines an outer diameter less than the inner diameter of the escutcheon yet sufficient to form the preferred fit. In an alternative arrangement, the upper surface of the cap wall 104 can extend radially outward for engaging a portion of the first surface 16a of the escutcheon 16 to form the desired interference fit while engaging or not engaging the sprinkler body 12 and trigger 14.

The cap 100 and its wall 104 are preferably spaced and more preferably spaced radially inward from the transition surface 16c of the escutcheon to expose the transition surface and the preferably oblique second surface 16b for coating. The cap wall 104 is preferably substantially annular and substantially centered about the sprinkler axis A-A. The cap wall 104 defines a first radius R1 relative to the assembly axis A-A that is less than a second radius R2 defined by the first surface 16a of the escutcheon relative to the assembly axis A-A, to define a preferred annular gap therebetween. The preferred annular gap is sufficient to form the coat-in-place assembly for coating the external surfaces of the escutcheon including at least frustoconical second surface 16b and the transition surface 16c. More preferably, the gap is sufficient to permit a coating material, such as paint, to enter the gap and coat at least a portion of the first surface 16a of the escutcheon 16. Accordingly, the preferred annular cap wall 104 is dimensioned to be disposed about or otherwise circumscribe the thermally responsive trigger 14. Moreover, the annular cap wall 104 can be dimensioned to define a diameter greater than, equal to or less than the maximum diameter or width of the outer surface of the sprinkler body 12 so long as the preferred cap 100 and annular wall 104 protect the trigger 14 and internal operational components of the sprinkler assembly 10 yet provide the preferred gap relative to the first surface 16a of the escutcheon 16 to facilitate the coating process.

Ease of accessibility to the transition surface 16c becomes more desired when the painting operation is controlled at a distance, for example, when the sprinkler assembly is installed in a pendent arrangement at the ceiling and the painter is operating below with a roller brush. To further facilitate access to the transition surface 16c, the preferred cap 100 presents a low profile relative to the escutcheon and its first end 18a. Once installed, the base 102 of the cap defines an inner surface 102a exposed to the trigger 14 and an outer surface 102b exposed to the protection area. The outer surface 102b of the cap 100 is preferably axially spaced from the transition surface at a distance Y to allow at least the second and transition surfaces 16b, 16c of the escutcheon 16 to be coated by roller or spray.

Figure 3:
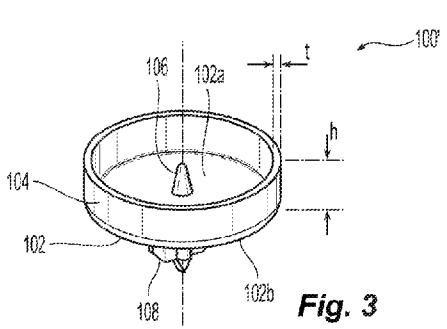
FIG. 3 is a perspective view of another preferred embodiment of a coating-inhibiting-cap for use in the combination of FIG. 1.
Figure 2:
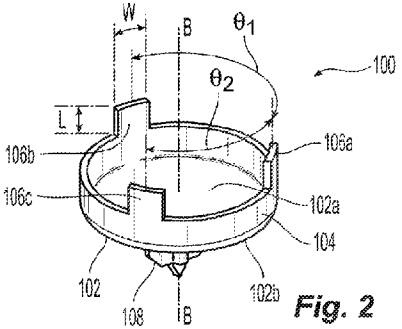
FIG. 2 is a perspective view of a preferred embodiment of a coating-inhibiting-cap for use in the combination of FIG. 1.

Shown in FIGS. 2 and 3 are respectively preferred alternate embodiments of the coating-inhibitor 100, 100', each of which is preferably embodied as a cap. In each of the preferred embodiments of the cap 100, 100' the base 102 preferably defines a center point of the cap and a periphery about the center point. The cap wall 104 extends along the periphery of the base 102 about the center point and extends axially from the base 102 substantially parallel to a cap axis B-B passing through the center point perpendicular to the base 102. The base 102 preferably defines a circular periphery and the wall 104 preferably circumscribes the cap axis B-B. The base 102 and cap wall can define alternate geometries provided the cap 100 can engage the installed sprinkler assembly in a manner as described herein. In the preferred embodiment of FIGS. 2 and 3, the base 102 is perpendicular to the axis B-B such that the cap 100 defines a cap height h and internal cap depth that is constant over the surface of the base 102. Alternatively, the base can includes a first portion disposed orthogonal to the cap axis, and one or more portions disposed between the cap wall and the first portion extending obliquely with respect to the cap axis such that the cap height h and internal cap depth varies over the surface of the base 102 with the cap base 102 tapering narrowly in the direction of the cap axis B-B. Preferred embodiments of the cap described herein are formed from a plastic material, preferably polypropylene, or alternatively polyethylene or other formable plastic material with the cap walls and base having a preferred thickness t surrounding the operative components of the sprinkler assembly. The preferred annular cap wall 104 defines an outer diameter and more preferably defines a preferred outer diameter ratio to cap wall thickness of 20:1 to 45:1.

At least one or more engagement tabs 106 extends preferably axially from one of the base 102 or the cap wall 104. In the preferred embodiment shown in FIG. 2, the cap 100 includes three tabs 106a, 106b, 106c extending axially from the cap wall 104. Alternatively, the cap 100 can include any one of two, four, five or more tabs. The preferred three tabs 106a, 106b, 106c are preferably angularly spaced about the cap axis to engage the correspondingly angularly spaced slots of the sprinkler assembly 10 formed between the sprinkler body 12 and the escutcheon 16. More preferably, the one or more engagement tabs 106 forms an appropriate fit within receiving slots formed about a preferred embodiment of the sprinkler body 12 and the escutcheon 16. In one preferred embodiment, two adjacent tabs 106 are preferably angularly spaced apart by 130 degrees with one adjacent tabs are preferably angularly spaced by 100 degrees. Each of the tabs 106a, 106, 106c defines a length L, a width W, with the preferred thickness t for insertion in a slot formed along the outer surface of the annular wall of the sprinkler body so as to enclose the chamber and the trigger between the sprinkler body and the cover surface of the cap in a manner as described herein. Preferred embodiments of the cap 100 define a tab length to thickness ratio ranging from about 6:1 to 12:1.

Shown in FIG. 3 is an alternate embodiment of the sprinkler cap 100' in which a single central tab 106 extends axially from the first or inner surface 102a of the base 102. In one preferred aspect, the central tab 106 preferably tapers narrowly from the base 102 in the axial direction. The central tab 106 is preferably configured for inserting or engaging and forming the desired fit within a central opening in the trigger 14.

Accordingly, the configuration of the cap 100, the sprinkler body 12 and trigger 14 can define the manner in which the cap surrounds, engages and/or contacts the sprinkler body 12 and/or trigger 14, so long as the cap 100 and sprinkler body 12 cooperate to encompass and protect the trigger 14 and internal components of the sprinkler assembly 10 while leaving the escutcheon 16 and its external surfaces exposed for coating, painting or other surface treatment. The preferred cap 100 and its cap wall 104 can be spaced about the distal peripheral surface of the sprinkler body 12, engage the distal periphery of the sprinkler body 12; or engage the distal end surface of the sprinkler body 12.

The assemblies and methods described herein include a preferred method of providing an aesthetically pleasing sprinkler assembly having a push-on escutcheon. More preferably provided are methods of obtaining a coating-inhibitor for locating the cap in the void about the thermally responsive trigger; and distributing the cap for forming a preferably coat-in-place assembly to coat at least the second surface and the transition surface. As used herein, "obtaining" includes manufacturing, purchasing or otherwise acquiring one or more caps for protecting the trigger and operational components of the sprinkler assembly for coating. With the cap(s) obtained, the caps can be distributed, sold, exchanged or otherwise disseminated for use in new or existing sprinkler assembly installations to provide the preferred in-place treatments described herein.

Figure 4A:
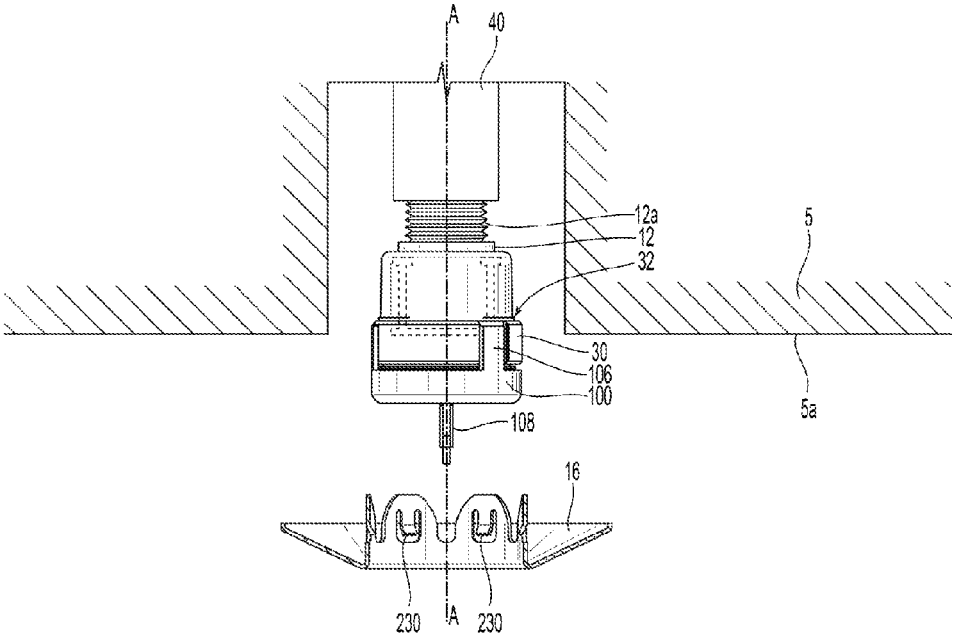
FIG. 4A is an exploded view of a first embodiment for combining the sprinkler assembly and cap of FIG. 2.
Figure 4B:
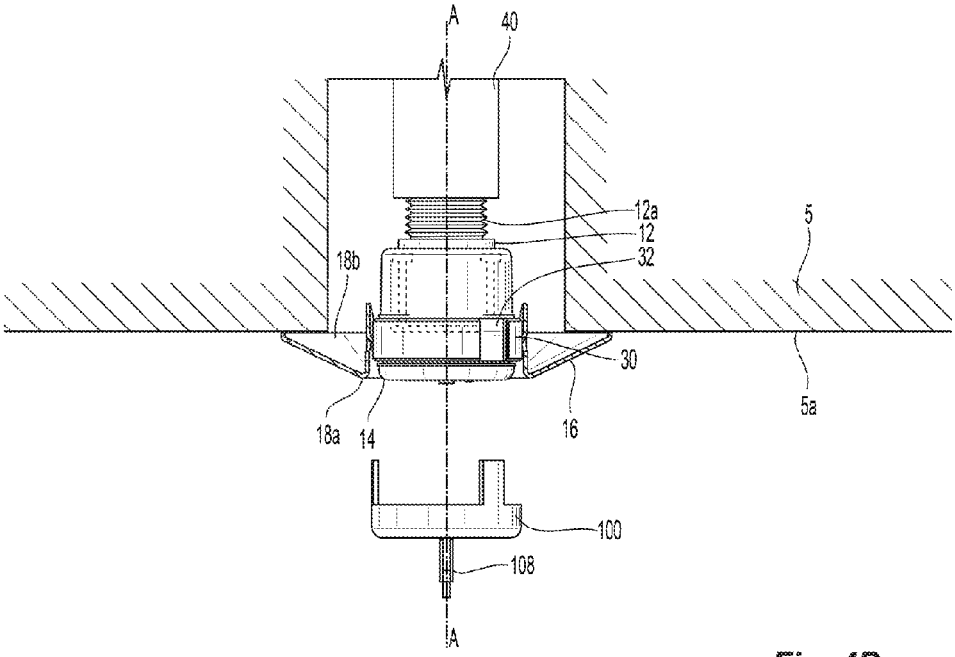
FIG. 4B is an exploded view of a second embodiment for combining the sprinkler assembly and cap of FIG. 2.
Figure 5A:
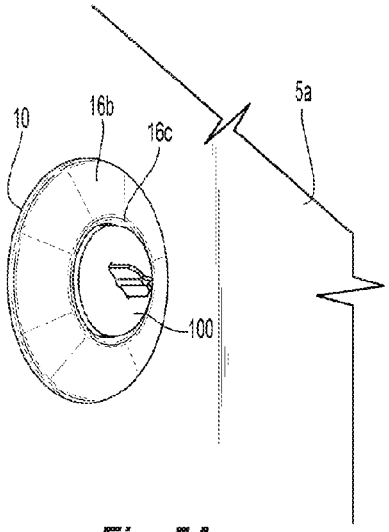
FIGS. 5A-5C provide an illustrative embodiment of coating a sprinkler assembly using the cap of FIG. 1.
Figure 5B:
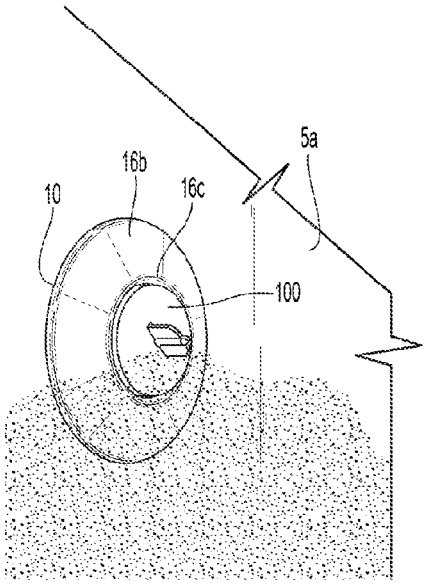
Figure 5C:
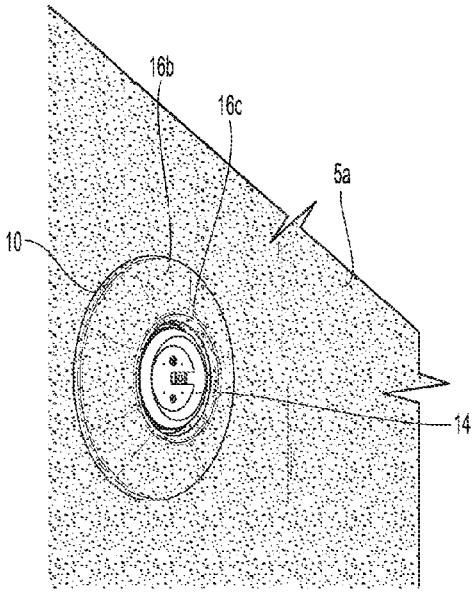

Shown in FIGS. 4A and 4B are alternate exploded views of preferred sprinkler assembly installations. More specifically, in FIG. 4A the preferred sprinkler body 12 is coupled to a fluid supply line within a cored through hole of the wall 5. The sprinkler body 12 and thermally responsive cover plate 14 is installed at an appropriate depth relative to the mounting surface 5a so that upon actuation an internal fluid deflecting member is properly located from the mounting surface 5a to distribute water or other firefighting fluid to address a fire in the protection area. The sprinkler body shown is a preferred embodiment of a sprinkler body 12 having angularly disposed engagement slots 32 about the body 12. A preferred cap 100 engages the sprinkler body with the engagement tabs 106 fitted within the slots 32 of the sprinkler body 12. With the sprinkler body 12 installed and cap 100 appropriately engaged, an escutcheon 16 is preferably pushed over the combined cap and sprinkler body to its preferred operative position with the first end 18a of the escutcheon about the trigger 14 to permit proper thermal response by the thermally responsive trigger 14 and the second end 18b of the escutcheon flush against the mounting surface 5a. With reference to FIGS. 5A-5C, the completed sprinkler assembly 10 with cap 100 encloses and protects the thermally responsive trigger 14 and the internal components of the installed sprinkler assembly 10 while exposing the visible surfaces of the escutcheon 16 for coating such as for example, painting or other aesthetically pleasing treatment. Once the paint or coating material has dried, the cap 100 can be removed and the sprinkler assembly and its system car be placed into service with the escutcheon coated as schematically shown.

Shown in FIG. 4B is an alternate installation. The preferred sprinkler body 12 is coupled to the fluid supply line within the cored through hole of a all 5. Again, the sprinkler body 12 and thermally responsive cover plate 14 are installed at an appropriate depth relative to the mounting surface 5a so that upon actuation an internal fluid deflecting member is properly located from the mounting surface 5a to distribute water or other firefighting fluid to address a fire in the protection area. As shown, the escutcheon 16 is pushed over the sprinkler body and preferably pushed to its operative position with its first end 18a disposed about the trigger 14 and with the second end 18b of the escutcheon positioned flush against the mounting surface 5a to permit proper thermal response by the thermally responsive trigger 14. With the escutcheon 16 centered about the sprinkler body 12 and trigger 14, the cap 100 is inserted into the voids formed between the sprinkler body 12 and the escutcheon 16 and engage the preferred slots 32 formed about the sprinkler body 12. Referring again to FIGS. 5A-5C, the completed sprinkler assembly 10 with cap 100 enclose and protect the thermally responsive trigger 14 and the internal components of the installed sprinkler assembly 10 while exposing the visible surfaces of the escutcheon 16 for coating such as for example, painting or other aesthetically pleasing treatment. Once the paint or coating material has dried, the cap 100 can be removed and the sprinkler assembly and its system can be placed into service with the escutcheon coated as schematically shown.

Referring again to FIGS. 4A and 4B, the preferred sprinkler body 12 preferably includes a proximal portion 12a and a distal portion[12b]. The proximal portion 12a of the sprinkler body preferably includes an external thread for coupling the sprinkler body to the branch or fluid supply line 40 of a sprinkler system containing a fire fighting fluid. Preferred embodiments of the sprinkler body 12 include an inlet, an outlet with an internal passageway extending therebetween from the proximal portion 12a to the distal portion[12b]. The distal portion [12b] preferably includes an annular wall 30 defining an opening preferably at the distal end of the body 12. The annular wall 30 includes an outer surface and an inner surface to define an internal chamber accessible by the opening. The chamber is preferably configured for housing internal operational components of the sprinkler body 12, including for example, a deflector assembly [24] for distribution of the firefighting fluid discharged from the sprinkler body outlet in an actuated state of the sprinkler assembly. As previously described the outer surface of the annular wall 30 preferably includes one or more and preferably three or more tool engaging notches, as seen for example in FIG. 4B, which preferably define the preferred engagement slots 32 for receiving the one or more tabs 106 of a preferred cap as previously described.

In a preferred embodiment of the sprinkler assembly 10, the preferred thermally responsive trigger 14 includes a first plate member and a second plate member coupled to the first plate member to further form a thermally responsive cover plate assembly. The cover plate assembly 14 is preferably supported by the sprinkler body adjacent the opening at the distal et d of the sprinkler body. In an unactuated state of the sprinkler body 12, the preferred thermally responsive trigger 14 conceals the distal opening and components of the sprinkler body 12 contained within its chamber.

A particular sprinkler body 12 and thermally responsive cover plate assembly 14 for use in the methods and assemblies described herein is the sprinkler body and thermally responsive link shown and described in TYCO FIRE PRODUCTS, LP Technical Data Sheet, TFP651. Further details of the preferred sprinkler body 12 and thermally responsive trigger 14 are shown and described in PCT International Patent Application Publications WO2008/067421 and WO2010/141948, each of which is incorporated by reference in its entirety. Exemplary installation and operation of a preferred sprinkler body 12 is shown and described in the referenced materials.

Still referring to FIG. 4A, a preferred push-on escutcheon 16 includes a plurality of radially disposed barbs 230 that engages the distal portion of the sprinkler body 12 and more preferably engages the annular wall 30 of the preferred sprinkler body 12 in the sprinkler assembly 10. The barbs 230 are preferably resilient with a central portion that is biased inward to engage the sprinkler body 12. In one preferred embodiment, the resilient barbs 230 can present a convex profile such that, collectively, the barbs 230 define an internal circumference that forms an interference fit about the sprinkler body 12. The escutcheon 16 can be alternatively configured to provide the self-centering arrangement about the sprinkler body.

While the present invention has been disclosed with reference certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

[1. A method of coating an escutcheon of a sprinkler assembly, the sprinkler assembly including a sprinkler and an escutcheon, the sprinkler including a body defining a sprinkler axis and a thermally responsive trigger supported by the body, the escutcheon including a first surface circumscribing an escutcheon axis, a second surface extending radially with respect to the escutcheon axis and a transition surface contiguous with the first and second surfaces, the method comprising:

locating a coating-inhibitor about the thermally responsive trigger;

mounting the escutcheon about the sprinkler;

disposing a coating on at least a portion of the first surface, the second surface and the transition surface of the escutcheon while the coating-inhibitor is located about the thermally responsive trigger and the escutcheon is mounted about the sprinkler; and removing the coating-inhibitor after disposing the coating.]

[2. The method of claim 1, wherein the locating includes locating the coating-inhibitor in a void between the sprinkler axis and the first surface of the escutcheon.]

[3. The method of claim 2, wherein locating includes locating the coating-inhibitor in a void between the sprinkler body and the first surface of the escutcheon.]

[4. The method of claim 2, wherein locating includes locating the coating-inhibitor in a void between the thermally responsive trigger and the first surface of the escutcheon.]

[5. The method of claim 2, wherein the coating-inhibitor includes a cap having a base defining a center and a periphery, the cap having a cap wall extending along the periphery of the base to surround a cap axis extending through the center perpendicular to the base, wherein locating the cap includes spacing the cap wall from the transition surface.]

[6. The method of claim 5, wherein the cap includes at least one tab extending axially from one of the base or the cap wall, wherein locating the cap includes engaging the at least one tab with one of the sprinkler body or the thermally responsive trigger to locate the cap wall about the thermally responsive trigger.]

[7. The method of claim 6, wherein the at least one tab includes three tabs extending axially from the cap wall and angularly spaced about the cap axis, wherein locating the cap includes engaging the three tabs with three slots correspondingly spaced and formed about the sprinkler body to locate the cap wall about the thermally responsive trigger.]

[8. The method of claim 6, wherein the at least one tab extends axially from the center point of the base so as to be surrounded by the cap wall, wherein locating the cap includes inserting the at least one tab in a central slot formed in the thermally responsive trigger to locate the cap wall about the thermally responsive trigger.]

[9. The method of claim 1, wherein mounting includes mounting the escutcheon in an operative position which locates the second end of the escutcheon against a wall, the escutcheon comprising a push-on escutcheon having a plurality of radially disposed barbs that engage a distal portion of the sprinkler body.]

[10. A method of coating an escutcheon of a sprinkler assembly including a sprinkler body defining a sprinkler axis and a thermally responsive trigger supported by the body, the escutcheon including a first surface circumscribing an escutcheon axis, a second surface extending radially with respect to the escutcheon axis and a transition surface contiguous with the first and second surfaces, the escutcheon being disposed about the sprinkler body to define a void between the sprinkler axis and the first surface of the escutcheon, the method comprising:

obtaining a coating-inhibitor; and distributing the coating-inhibitor to use in a coat-in-place assembly that includes the sprinkler assembly and the coating-inhibitor being engaged with one of a distal portion of the sprinkler body and the thermally responsive trigger to expose at least a portion of the first surface, the transition surface, and the second surface of the escutcheon for coating while the coating-inhibitor is engaged with one of a distal portion of the sprinkler body and the thermally responsive trigger and the escutcheon is disposed about the sprinkler body.]

[11. The method of claim 10, wherein obtaining the coating-inhibitor includes obtaining a cap having a base defining a center point and a periphery about the center point; a cap wall extending along the periphery of the cap base about the center point and extending axially from the base substantially parallel to a cap axis passing through the center point perpendicular to the base; and at least one tab extending axially from one of the base or the cap wall.]

[12. The method of claim 11, wherein obtaining the at least one tab includes obtaining three tabs extending axially from the cap wall, the three tabs being angularly spaced about the cap axis with two adjacent tabs being angularly spaced apart by 130 degrees.]

[13. The method of claim 12, wherein the distributing includes distributing the cap for insertion of each of the tabs in a slot formed along an outer surface of the sprinkler body so as to enclose the thermally responsive trigger between the sprinkler body and the cap.]

[14. The method of claim 12, wherein obtaining the coating-inhibiting-cap includes each of the three tabs defining a tab length to thickness ratio ranging from about 6:1 to 12:1.]

[15. The method of claim 11, wherein distributing the cap includes distributing the cap wall for location within an annular gap formed between the sprinkler body and the first surface of the escutcheon, the cap wall being spaced from the transition surface of the escutcheon.]

[16. The method of claim 11, wherein distributing the cap includes distributing the cap wall for location within an annular gap formed between the thermally responsive trigger and the first surface of the escutcheon, the cap wall being spaced from the transition surface of the escutcheon.]

[17. The method of claim 11, wherein obtaining the at least one tab includes extending the at least one tab axially from the center point of the base so as to be surrounded by the cap wall.]

[18. The method of claim 17, wherein distributing the cap is for insertion of the at least one tab for insertion in a central slot formed in the thermally responsive trigger to enclose the thermally responsive trigger between the sprinkler body and the cap.]

[19. The method of claim 11, wherein obtaining the cap includes obtaining a handle portion extending from the base axially in a direction opposite the cap wall.]

[20. The method of claim 11, wherein obtaining the cap includes obtaining a first portion of the base disposed orthogonal to the cap axis, and a second portion of the base disposed between the cap wall and the first portion extending obliquely with respect to the cap axis.]

[21. The method of claim 10, wherein the escutcheon of the sprinkler assembly comprises a push-on escutcheon having a plurality of radially disposed barbs that engage an annular wall of a distal portion of the sprinkler body.]

[22. The method of claim 21, wherein the coating-inhibitor being engaged with the annular wall of the distal portion of the sprinkler body.]

*23. A sprinkler assembly, comprising:*

*an internal passageway having an inlet and an outlet spaced apart along a longitudinal sprinkler axis;*

*a thermally responsive trigger disposed adjacent the outlet along the longitudinal axis;*

*an outer wall around the internal passageway and the thermally responsive trigger;*

*an escutcheon having a first end and a second end spaced apart along an escutcheon axis, the escutcheon having a first surface circumscribed about the escutcheon axis to define a central escutcheon opening for receiving the outer wall, the escutcheon having a second surface extending radially with respect to the first surface and circumscribed about the central escutcheon opening; and*

*a removable cap for engaging with, via at least one of a friction fit and an interference fit, at least one of the outer wall, the thermally responsive trigger, and the escutcheon to enclose and protect the thermally responsive trigger, the cap including a handle portion for manipulation of the cap, the cap radially spaced inward relative to the first surface of the escutcheon so as to expose the first surface of the escutcheon.*

*24. The sprinkler assembly of claim 23, comprising:*

*the cap comprises a base that includes the handle portion and a cap wall extending from the base.*

*25. The sprinkler assembly of claim 23, comprising:*

*the cap comprises a base that includes the handle portion and a cap wall extending from the base, the handle portion extends centrally along a cap axis of the cap in a direction opposite the cap wall.*

*26. The sprinkler assembly of claim 23, comprising:*

*one more receiving slots that receive one or more engagement tabs of the cap.*

*27. The sprinkler assembly of claim 23, comprising:*

*the cap is made of a plastic material.*

*28. The sprinkler assembly of claim 23, comprising:*

*the cap includes a cap wall having an outer diameter and a thickness, a ratio of the outer diameter to the thickness is greater than or equal to twenty to one and less than or equal to forty five to one.*

*29. The sprinkler assembly of claim 23, comprising:*

*a transition surface contiguous with and between the first surface and the second surface.*

*30. The sprinkler assembly of claim 23, comprising:*

*a transition surface contiguous with the first surface and the second surface, the transition surface is curved or radiused.*

*31. The sprinkler assembly of claim 23, comprising:*

*an external thread that couples the internal passageway to a fluid source.*

*32. The sprinkler assembly of claim 23, comprising:*

*an external thread that couples the internal passageway to a fluid source, the external thread orients the internal passageway for a pendent orientation or a sidewall orientation.*

*33. The sprinkler assembly of claim 23, comprising:*

*the thermally responsive trigger conceals the outlet of the internal passageway.*

*34. The sprinkler assembly of claim 23, comprising:*

*an outer diameter of the cap is less than an outer diameter of the escutcheon.*

*35. The sprinkler assembly of claim 23, comprising:*

*the handle portion comprises an elongate member.*

*36. The sprinkler assembly of claim 23, comprising:*

*the handle portion comprises a hook or eyelet for engagement by a tool.*

*37. The sprinkler assembly of claim 23, comprising:*

*the first surface is angled relative to the second surface.*

*38. The sprinkler assembly of claim 23, comprising:*

*the cap comprises a cap wall sized to be positioned inward of the first surface responsive to the cap engaging the at least one of the outer wall, the thermally responsive trigger, and the escutcheon.*

*39. The sprinkler assembly of claim 23, comprising:*

*the cap comprises a central tab that extends from an inner surface of a base of the cap towards the escutcheon.*

*40. The sprinkler assembly of claim 23, comprising:*

*the cap engages a portion of the first surface.*

*41. The sprinkler assembly of claim 23, comprising:*

*the cap defines a cap axis, the cap comprises a base and a cap wall extending from the base, the base includes a first portion orthogonal to the cap axis and one or more second portions disposed between the cap wall and the first portion and extending obliquely with respect to the cap axis.*

*42. A method of coating an escutcheon of a sprinkler assembly, the sprinkler assembly including a sprinkler and an escutcheon, the sprinkler including a body defining a sprinkler axis and a thermally responsive trigger supported by the body, the escutcheon including a first surface circumscribing an escutcheon axis, a second surface extending*

*radially with respect to the escutcheon axis and a transition surface contiguous with the first and second surfaces, the method comprising:*

*locating a coating-inhibitor about the thermally responsive trigger;*

*mounting the escutcheon about the sprinkler;*

*disposing a coating on at least a portion of the first surface, the second surface and the transition surface of the escutcheon while the coating-inhibitor is located about the thermally responsive trigger and the escutcheon is mounted about the sprinkler; and*

*removing the coating-inhibitor after disposing the coating.*

*43. The method of claim 42, wherein the locating includes locating the coating-inhibitor in a void between the sprinkler axis and the first surface of the escutcheon.*

*44. The method of claim 43, wherein locating includes locating the coating-inhibitor in a void between the sprinkler body and the first surface of the escutcheon.*

*45. The method of claim 43, wherein locating includes locating the coating-inhibitor in a void between the thermally responsive trigger and the first surface of the escutcheon.*

*46. The method of claim 43, wherein the coating-inhibitor includes a cap having a base defining a center and a periphery, the cap having a cap wall extending along the periphery of the base to surround a cap axis extending through the center perpendicular to the base, wherein locating the cap includes spacing the cap wall from the transition surface.*

*47. The method of claim 46, wherein the cap includes at least one tab extending axially from one of the base or the cap wall, wherein locating the cap includes engaging the at least one tab with one of the sprinkler body or the thermally responsive trigger to locate the cap wall about the thermally responsive trigger.*

*48. The method of claim 47, wherein the at least one tab includes three tabs extending axially from the cap wall and angularly spaced about the cap axis, wherein locating the cap includes engaging the three tabs with three slots correspondingly spaced and formed about the sprinkler body to locate the cap wall about the thermally responsive trigger.*

*49. The method of claim 47, wherein the at least one tab extends axially from the center point of the base so as to be surrounded by the cap wall, wherein locating the cap includes inserting the at least one tab in a central slot formed in the thermally responsive trigger to locate the cap wall about the thermally responsive trigger.*

*50. The method of claim 42, wherein mounting includes mounting the escutcheon in an operative position which locates the second end of the escutcheon against a wall, the escutcheon comprising a push-on escutcheon having a plurality of radially disposed barbs that engage a distal portion of the sprinkler body.*

*51. A method of coating an escutcheon of a sprinkler assembly including a sprinkler body defining a sprinkler axis and a thermally responsive trigger supported by the body, the escutcheon including a first surface circumscribing an escutcheon axis, a second surface extending radially with respect to the escutcheon axis and a transition surface contiguous with the first and second surfaces, the escutcheon being disposed about the sprinkler body to define a void between the sprinkler axis and the first surface of the escutcheon, the method comprising:*

*obtaining a coating-inhibitor; and*

*distributing the coating-inhibitor to use in a coat-in-place assembly that includes the sprinkler assembly and the coating-inhibitor being engaged with one of a distal portion of the sprinkler body and the thermally responsive trigger to expose at least a portion of the first surface, the transition surface, and the second surface of the escutcheon for coating while the coating-inhibitor is engaged with one of a distal portion of the sprinkler body and the thermally responsive trigger and the escutcheon is disposed about the sprinkler body.*

*52. The method of claim 51, wherein obtaining the coating-inhibitor includes obtaining a cap having a base defining a center point and a periphery about the center point; a cap wall extending along the periphery of the cap base about the center point and extending axially from the base substantially parallel to a cap axis passing through the center point perpendicular to the base; and at least one tab extending axially from one of the base or the cap wall.*

*53. The method of claim 52, wherein obtaining the at least one tab includes obtaining three tabs extending axially from the cap wall, the three tabs being angularly spaced about the cap axis with two adjacent tabs being angularly spaced apart by 130 degrees.*

*54. The method of claim 53, wherein the distributing includes distributing the cap for insertion of each of the tabs in a slot formed along an outer surface of the sprinkler body so as to enclose the thermally responsive trigger between the sprinkler body and the cap.*

*55. The method of claim 53, wherein obtaining the coating-inhibiting-cap includes each of the three tabs defining a tab length to thickness ratio ranging from about 6:1 to 12:1.*

*56. The method of claim 52, wherein distributing the cap includes distributing the cap wall for location within an annular gap formed between the sprinkler body and the first surface of the escutcheon, the cap wall being spaced from the transition surface of the escutcheon.*

*57. The method of claim 52, wherein distributing the cap includes distributing the cap wall for location within an annular gap formed between the thermally responsive trigger and the first surface of the escutcheon, the cap wall being spaced from the transition surface of the escutcheon.*

*58. The method of claim 52, wherein obtaining the at least one tab includes extending the at least one tab axially from the center point of the base so as to be surrounded by the cap wall.*

*59. The method of claim 58, wherein distributing the cap is for insertion of the at least one tab for insertion in a central slot formed in the thermally responsive trigger to enclose the thermally responsive trigger between the sprinkler body and the cap.*

*60. The method of claim 52, wherein obtaining the cap includes obtaining a handle portion extending from the base axially in a direction opposite the cap wall.*

*61. The method of claim 52, wherein obtaining the cap includes obtaining a first portion of the base disposed orthogonal to the cap axis, and a second portion of the base disposed between the cap wall and the first portion extending obliquely with respect to the cap axis.*

*62. The method of claim 51, wherein the escutcheon of the sprinkler assembly comprises a push-on escutcheon having a plurality of radially disposed barbs that engage an annular wall of a distal portion of the sprinkler body.*

*63. The method of claim 62, wherein the coating-inhibitor being engaged with the annular wall of the distal portion of the sprinkler body.*

* * * * *